US007950433B2

(12) United States Patent
Sperry et al.

(10) Patent No.: US 7,950,433 B2
(45) Date of Patent: May 31, 2011

(54) MACHINE FOR INFLATING AND SEALING AN INFLATABLE WEB

(75) Inventors: Laurence Sperry, Newton, MA (US); Eric Kane, Lynn, MA (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 207 days.

(21) Appl. No.: 12/378,212

(22) Filed: Feb. 12, 2009

(65) Prior Publication Data

US 2010/0200169 A1 Aug. 12, 2010

(51) Int. Cl.
*B32B 41/00* (2006.01)

(52) U.S. Cl. ........ 156/361; 156/495; 156/497; 156/498; 53/89; 53/95; 53/96; 53/403; 53/459; 53/569

(58) Field of Classification Search .................. 156/495, 156/497, 498, 145, 147, 361; 53/89, 95, 53/96, 403, 459, 568
See application file for complete search history.

(56) References Cited

U.S. PATENT DOCUMENTS

| | | | |
|---|---|---|---|
| 3,546,433 A | 12/1970 | Johnson | |
| 3,575,757 A | 4/1971 | Smith | |
| 3,596,428 A | 8/1971 | Young | |
| 3,660,189 A | 5/1972 | Troy | |
| 3,703,263 A * | 11/1972 | Hunter | 242/129.8 |
| 3,703,430 A | 11/1972 | Rich | |
| 3,735,551 A | 5/1973 | Pratt | |
| 3,817,803 A | 6/1974 | Horsky | |
| 3,868,285 A | 2/1975 | Troy | |
| 4,017,351 A | 4/1977 | Larson et al. | |
| 4,096,306 A | 6/1978 | Larson | |
| 4,384,442 A | 5/1983 | Pendleton | |
| 4,847,126 A | 7/1989 | Yamashiro et al. | |
| 5,187,917 A | 2/1993 | Mykleby | |
| 5,216,868 A | 6/1993 | Cooper et al. | |
| 5,340,632 A | 8/1994 | Chappuis | |
| 5,351,828 A | 10/1994 | Becker et al. | |
| 5,376,219 A | 12/1994 | Sperry et al. | |
| 5,581,983 A | 12/1996 | Murakami | |
| 5,660,662 A | 8/1997 | Testone | |
| 5,679,208 A | 10/1997 | Sperry et al. | |
| 5,824,392 A | 10/1998 | Gotoh et al. | |
| 5,937,614 A | 8/1999 | Watkins et al. | |
| 5,942,076 A | 8/1999 | Salerno et al. | |
| RE36,501 E | 1/2000 | Hoover et al. | |
| 6,195,966 B1 | 3/2001 | Shomron et al. | |
| 6,209,286 B1 | 4/2001 | Perkins et al. | |
| 6,410,119 B1 | 6/2002 | De Luca et al. | |
| 6,460,313 B1 | 10/2002 | Cooper | |
| 6,565,946 B2 | 5/2003 | Perkins et al. | |
| 6,582,800 B2 | 6/2003 | Fuss et al. | |
| 6,605,169 B2 | 8/2003 | Perkins et al. | |
| 6,635,145 B2 | 10/2003 | Cooper | |
| 6,651,406 B2 | 11/2003 | Sperry et al. | |
| 6,659,150 B1 | 12/2003 | Perkins et al. | |

(Continued)

FOREIGN PATENT DOCUMENTS

| | | |
|---|---|---|
| WO | 00/64672 | 11/2000 |

(Continued)

*Primary Examiner* — George R Koch, III
(74) *Attorney, Agent, or Firm* — Thomas C. Lagaly

(57) ABSTRACT

A machine for inflating and sealing an inflatable web comprising a series of pre-formed flexible containers, each of the pre-formed containers being capable of holding therein a quantity of gas and having an opening for receiving such gas.

22 Claims, 11 Drawing Sheets

U.S. PATENT DOCUMENTS

| | | | |
|---|---|---|---|
| 6,682,622 | B2 | 1/2004 | Matarasso |
| 6,804,933 | B2 | 10/2004 | Sperry et al. |
| 6,952,910 | B1 | 10/2005 | Lorsch |
| 2002/0166788 | A1 | 11/2002 | Sperry et al. |
| 2004/0206050 | A1 | 10/2004 | Fuss et al. |
| 2005/0155326 | A1 | 7/2005 | Thomas |
| 2005/0188659 | A1 | 9/2005 | Lerner et al. |
| 2005/0202212 | A1 | 9/2005 | Matarasso |
| 2005/0221059 | A1 | 10/2005 | Matarasso |
| 2006/0090421 | A1 | 5/2006 | Sperry et al. |
| 2006/0112663 | A1 | 6/2006 | Perkins et al. |
| 2006/0174589 | A1 | 8/2006 | O'Dowd |
| 2006/0218880 | A1 | 10/2006 | Sperry et al. |
| 2006/0289108 | A1 | 12/2006 | McNamara, Jr. et al. |
| 2007/0011989 | A1 * | 1/2007 | Sperry et al. .................... 53/403 |

FOREIGN PATENT DOCUMENTS

| | | | |
|---|---|---|---|
| WO | 01/74686 | A2 | 10/2001 |
| WO | 03/103929 | | 12/2003 |
| WO | 03/104103 | | 12/2003 |
| WO | 2004/074104 | | 9/2004 |

* cited by examiner

MACHINE FOR INFLATING AND SEALING AN INFLATABLE WEB

BACKGROUND OF THE INVENTION

The present invention relates to inflated packaging containers, i.e., cushions, and, more particularly, to a simplified and improved machine for producing the same.

Various machines for forming inflated cushions, pillows, or other inflated containers are known. For packaging applications, inflated cushions are used to package items, by wrapping the items in the cushions and placing the wrapped items in a shipping carton, or simply placing one or more inflated cushions inside of a shipping carton along with an item to be shipped. The cushions protect the packaged item by absorbing impacts that may otherwise be fully transmitted to the packaged item during transit, and also restrict movement of the packaged item within the carton to further reduce the likelihood of damage to the item.

Earlier machines for forming inflated cushions tended to be rather large, expensive and complex. More recently, smaller, less-expensive inflation machines have been developed, which employ inflatable webs having pre-formed containers. Many such machines, however, suffer from alignment and tracking problems of the inflatable web through the machine, resulting in poorly-inflated, non-inflated, and/or poorly-sealed cushions, which lead to web wastage and/or cushions that deflated prematurely or otherwise failed to protect the packaged product.

Accordingly, there remains a need in the art for a simple and reliable machine for producing gas-filled packaging cushions.

SUMMARY OF THE INVENTION

Those needs are met by the present invention, which, in one aspect, provides a machine for inflating and sealing an inflatable web having first and second longitudinal edges and comprising a series of pre-formed flexible containers, each of the pre-formed containers being capable of holding therein a quantity of gas and having an opening at said first edge for receiving such gas, the machine comprising:

a. a support structure having a base and a wall extending upwards from the base;

b. a spool for rotatively supporting a roll of the inflatable web, the spool having a proximal end, at which the spool is attached to the wall, and an opposing distal end, which is spaced from the wall, the distal end having a higher elevation relative to the proximal end such that the roll is gravitationally biased towards the wall;

c. a drive mechanism mounted to the support structure for withdrawing the inflatable web from the roll and advancing the web along a path of travel beside the wall, with the web being oriented such that the first edge thereof is adjacent to the wall;

d. an inflation nozzle positioned to direct gas into the openings of the containers as the web is advanced along the path, thereby inflating the containers; and e. a sealing device located proximate the inflation nozzle for sealing closed the openings of the inflated containers, wherein, the gravitational bias of the roll towards the wall urges the first edge of the web into alignment with the drive mechanism, inflation nozzle, and sealing device.

In accordance with another aspect of the present invention, a machine is provided for inflating and sealing an inflatable web comprising a series of pre-formed flexible containers, each of the pre-formed containers being capable of holding therein a quantity of gas and having an opening for receiving such gas, the machine comprising:

a. a support structure having a base and a wall extending upwards from the base;

b. a spool attached to the wall for rotatively supporting a roll of the inflatable web;

c. a drive mechanism mounted to the support structure for withdrawing the inflatable web from the roll by inducing tension in the web to advance the web along a path of travel beside the wall, with the web being oriented such that the openings of the containers are adjacent to the wall;

d. a tension-control device located proximate the wall for applying frictional resistance to the web in opposition to the advancement of the web along the path, the frictional resistance varying in response to changes in the tension in the web as it is withdrawn from the roll;

e. an inflation nozzle positioned to direct gas into the openings of the containers as the web is advanced along the path, thereby inflating the containers; and f. a sealing device located proximate the inflation nozzle for sealing closed the openings of the inflated containers.

These and other aspects and features of the invention may be better understood with reference to the following description and accompanying drawings.

DETAILED DESCRIPTION OF THE INVENTION

Figure 1:
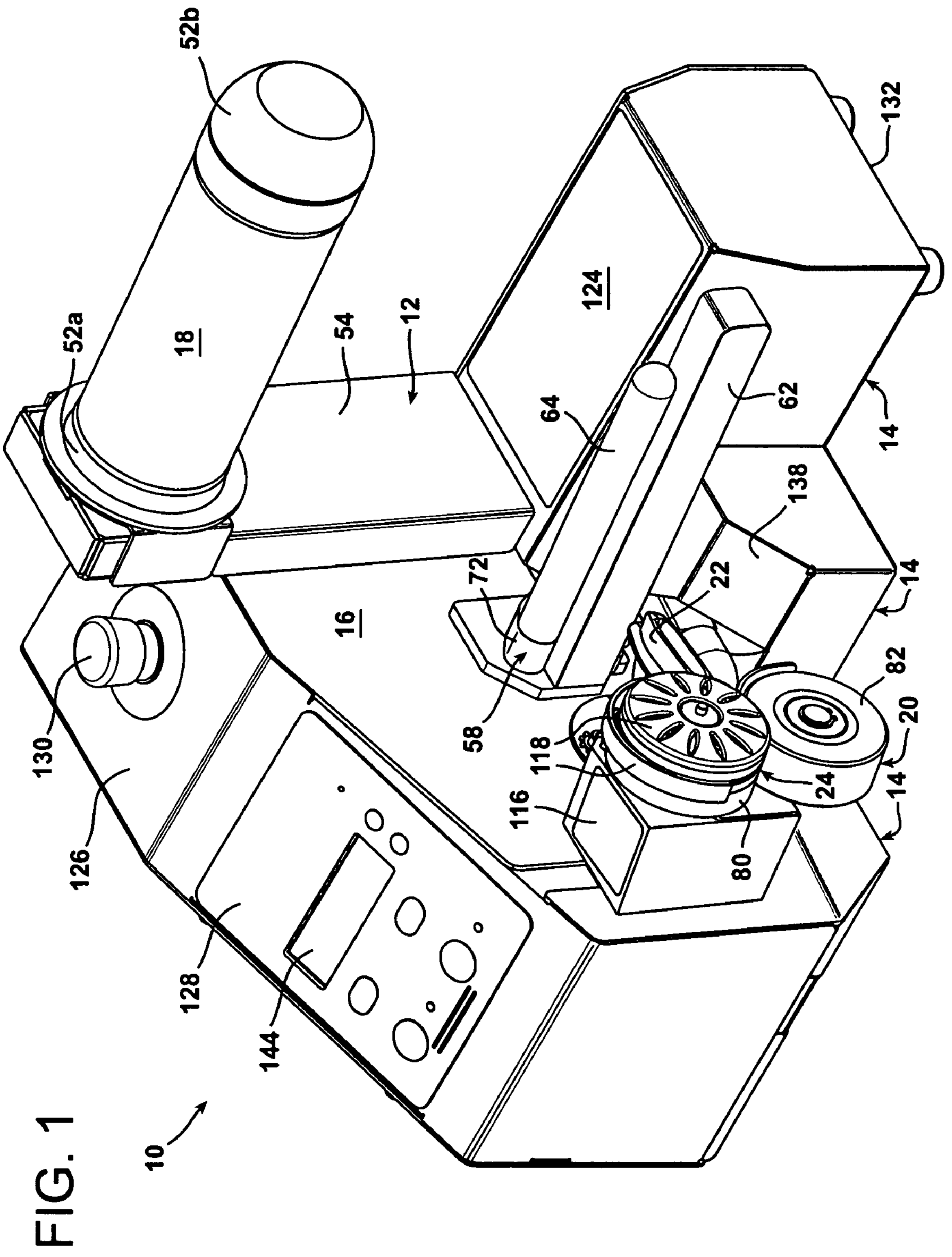
FIG. 1 is a perspective view of a machine, in accordance with the present invention, for inflating and sealing an inflatable web having pre-formed containers.

FIG. 1 illustrates a machine 10 for inflating and sealing an inflatable web in accordance with the present invention. Machine 10 generally comprises a support structure 12 having a base 14 and a wall 16 extending upwards from the base, a spool 18 for rotatively supporting a roll of the inflatable web, a drive mechanism 20 mounted to the support structure 12 for withdrawing the inflatable web from the roll, an inflation nozzle 22 for inflating the containers, and a sealing device 24 located proximate to the inflation nozzle for sealing closed the inflated containers.

Figure 2:
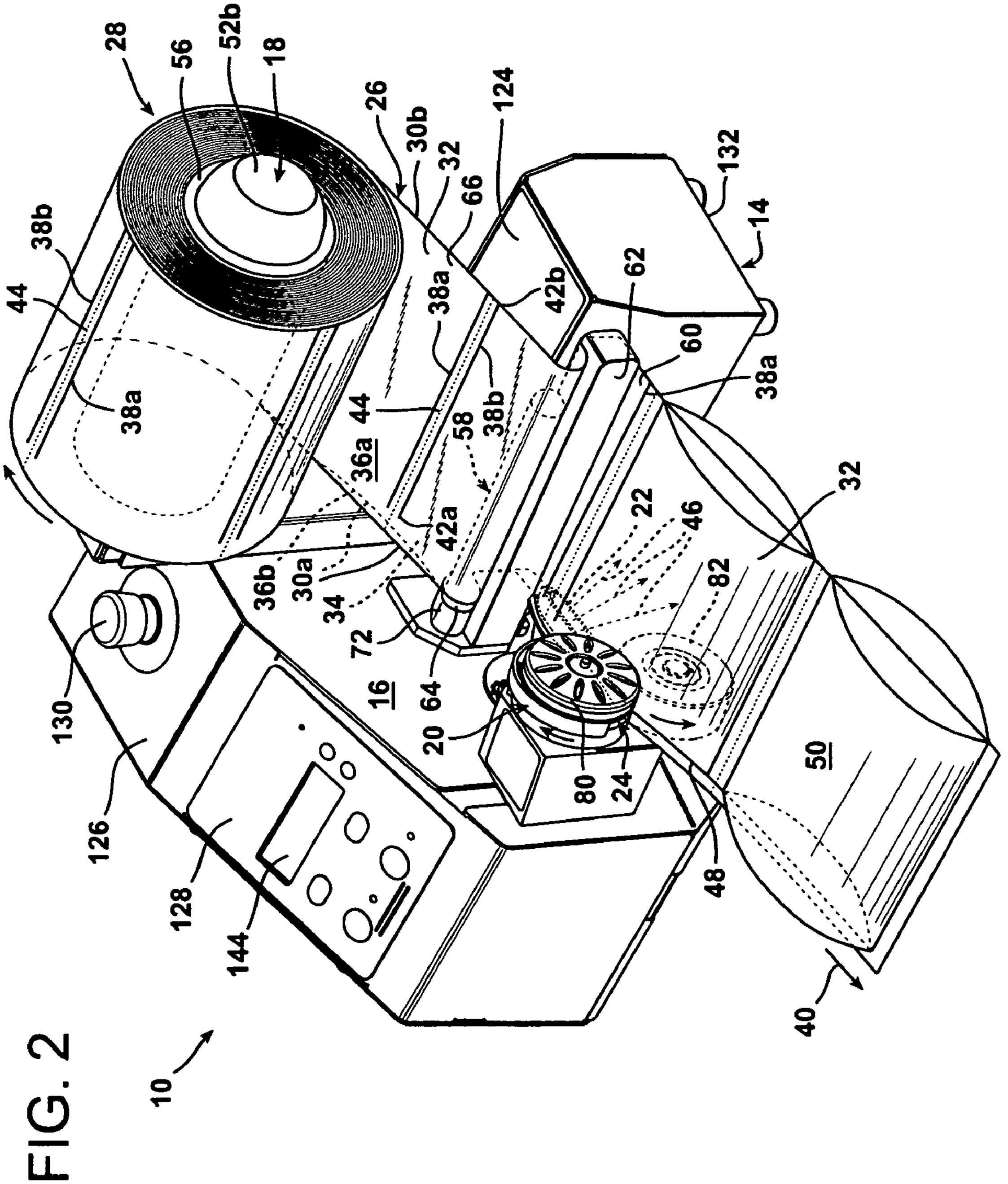
FIG. 2 is similar to FIG. 1, except that it illustrates the machine being used with a roll of an inflatable web to inflate and seal the pre-formed containers included on such web.

FIG. 2 illustrates machine 10 being used to inflate and seal an inflatable web 26. Web 26 is in the form of a roll 28, which is rotatively supported by spool 18. Web 26 has first and second longitudinal edges 30*a, b*, and includes a series of pre-formed flexible containers 32. Each of the pre-formed containers 32 is capable of holding therein a quantity of gas, e.g., air, and each has an opening 34 at the first edge 30*a* for receiving such gas.

Web 26 may comprise two juxtaposed film plies 36*a, b*. As contained on roll 28, first longitudinal edge 30*a* of the web 26 is open, i.e., unsealed, while second longitudinal edge 30*b* is closed, e.g., sealed or folded. The containers 32 may be defined between a pair of transverse seals 38*a, b*. Seals 38*a, b* are described as 'transverse' because they are aligned in a direction that is generally transverse to the general longitudinal direction of the path of travel 40 of web 26 through machine 10. The 'downstream' transverse seal of each container is designated 38*a* while the 'upstream' seal is designated 38*b*. The openings 34 of the containers 32 are formed by the open first edge 30*a* of the web 26 and the first ends 42*a* of the transverse seals 38. The first ends 42*a* of the transverse seals are spaced from first edge 30*a*, in order to accommodate inflation nozzle 22 within web 26, i.e., between film plies 36*a, b*, while the opposing second ends 42*b* terminate at the closed second edge 30*b*. In order to allow individual or groups of inflated containers to be separated from the web 26, a line of weakness 44, e.g., a perforated line, may be included between each container 32, i.e., between each downstream/upstream pair of transverse seals 38*a, b* as shown.

Web 26 may, in general, comprise any flexible film material that can be manipulated by machine 10 to enclose a gas as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

As shown in FIG. 2, drive mechanism 20 advances web 26 along path of travel 40 beside wall 16, with the web being oriented such that the first edge 30*a* thereof is adjacent to the wall. Inflation nozzle 22 is positioned to direct gas, as indicated by arrows 46, into the openings 34 of the containers 32 as the web 26 is advanced along the path 40, thereby inflating the containers.

As also shown in FIG. 2, sealing device 24 may be positioned just downstream of the inflation nozzle 22 so that it substantially contemporaneously seals closed the openings 34 of the containers 32 as they are being inflated. Sealing device 24 may seal closed openings 34 by producing a longitudinal seal 48 between film plies 36*a, b*, which also intersects transverse seals 38*a, b* near the first ends 42*a* thereof to enclose gas 46 within the containers 32. In this manner, the pre-formed flexible containers 32 of web 26 are converted into inflated containers 50.

Referring back to FIG. 1, it may be seen that spool 18 has a proximal end 52*a*, at which the spool is attached to wall 16, and an opposing distal end 52*b*, which is spaced from the wall. As perhaps best shown in FIG. 3, in accordance with an advantageous feature of the invention, the distal end 52*b* has a higher elevation relative to the proximal end 52*a*, i.e., the spool 18 has an upward angle (relative to a horizontal plane, e.g., to base 14) as the spool extends away from the wall 16. In this manner, when a web roll 28 is mounted thereon (as shown in FIG. 2), the roll is gravitationally biased towards the wall 16.

The upwardly-angled configuration of the spool is advantageous in that the gravitational bias of the roll 28 towards the wall 16 urges the first longitudinal edge 30*a* of the web 26 into alignment with the drive mechanism 20, inflation nozzle 22, and sealing device 24. By urging alignment of the first edge 30*a* with the drive mechanism 20, inflation nozzle 22, and sealing device 24, the inventors found that the inflation and sealing problems of conventional machines (due primarily to mis-alignment between the web and the drive, inflation, and sealing systems), are minimized with machine 10 in accordance with the present invention. The gravitational bias of the roll 28 towards the wall 16 thus enhances the reliability of machine 10 by improving the consistency of the inflation and sealing operations.

The upward angle of spool 18 is also beneficial in that it facilitates the manual act of loading of a new web roll onto the spool. Not only is the upward angle more ergonomic for roll loading, but gravity assists in sliding the roll all the way onto the spool 18.

The degree of elevation of the distal end 52*b* of spool 18 may be such that the upward angle of the spool relative to a horizontal plane ranges from greater than 0 to about 90 degrees, e.g., between about 1 to about 45 degrees, such as from about 2 to about 30 degrees, about 3 to about 20 degrees, or from about 4 to about 10 degrees. As an example, an upward angle of about 6 degrees above horizontal was found to work well.

In order to accommodate the weight of a full roll 28, spool 18 may be attached to wall 16 via a support bracket 54. While bracket 54 may have the effect of spacing the inboard edge of roll 28 (where first edge 30*a* of web 26 is located) from wall 16, the drive 20, inflation 22, and seal 24 components may be similarly spaced from the wall to achieve a desired travel path 40 through such components. Support bracket 54 may also serve to elevate spool 18 such that there is sufficient space between the spool and base 14 to accommodate a roll 28 having a desired maximum, full-width diameter.

As illustrated in the drawings, the distal end 52*b* of the spool 18 is unsupported such that the spool is cantilevered from support bracket 54 on wall 16. Alternatively, e.g., for large and/or heavy web rolls, the distal end 52*b* may be supported by a suitable structural component, e.g., an upstanding post with a cradle on which the distal end 52*b* rests.

Spool 18 may be non-rotatably attached to wall 16/support bracket 54 such that roll 28 rotates thereagainst, i.e., with the core 56 of roll 28 rotating frictionally against the outer surface of spool 18. Alternatively, spool 18 may be rotatably mounted to the wall 16/support bracket 54 such that the roll 28 rotates with the spool as the spool rotates relative to the wall/bracket.

Figure 3:
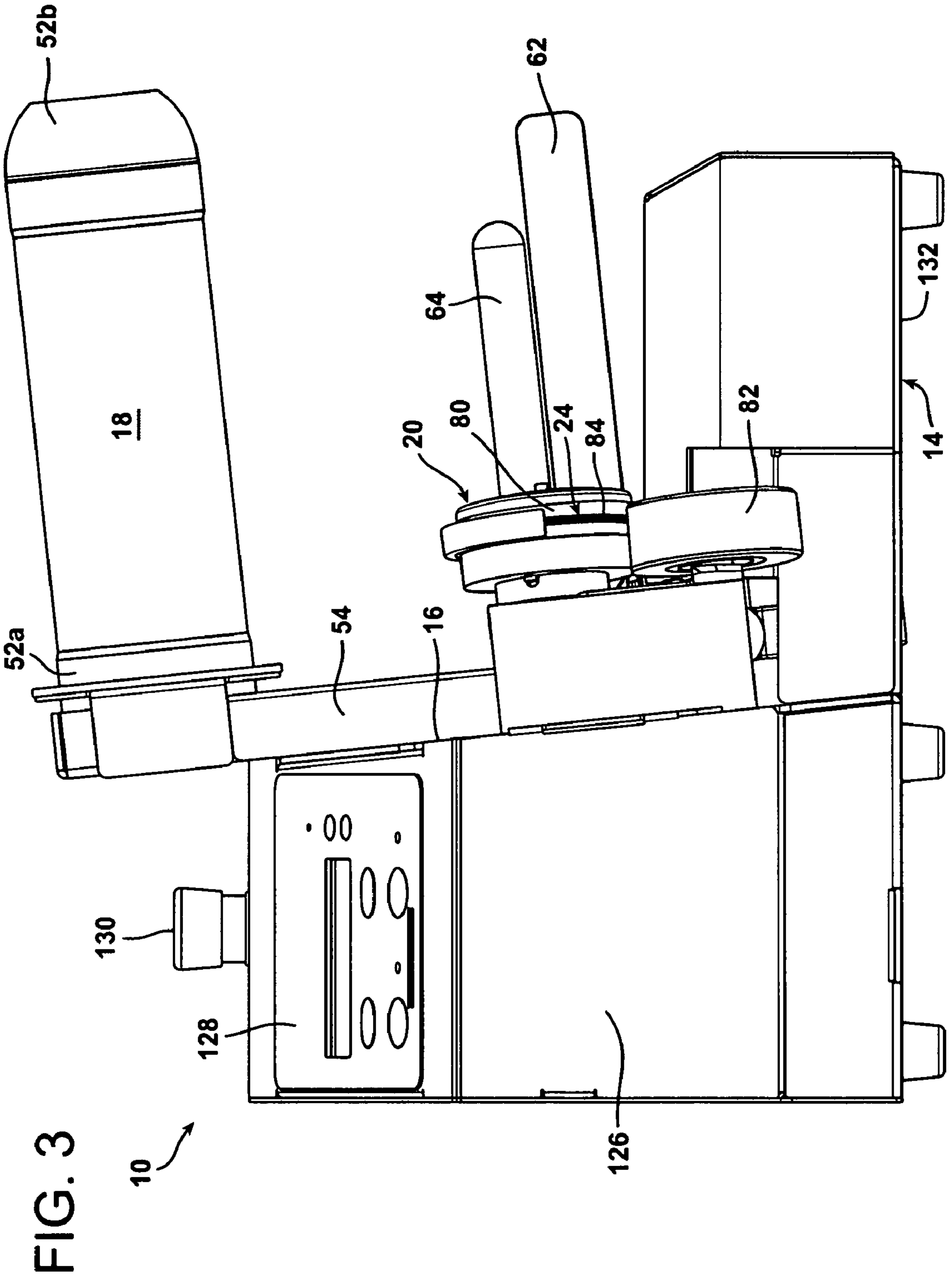
FIG. 3 is a front elevational view of the machine shown in FIG. 1.

The upward angle of spool 18 may be achieved as shown in FIG. 3 by orienting wall 16, and also support bracket 54, at an angle relative to a vertical plane, with spool 18 being substantially perpendicular to the wall. Alternatively, wall 16 (and also support bracket 54) may be oriented in a substantially vertical plane, with spool 18 mounted on the wall (and/or on bracket 54) at an upward angle relative to a horizontal axis passing through the vertical plane.

In accordance with another aspect of the invention, machine 10 may further include a tension-control device 58 for applying frictional resistance to the web 26 in opposition to the advancement of the web along path 40 through the machine. The frictional resistance applied by tension-control device 58 varies in response to changes in the tension in the web 26 as it is withdrawn from roll 28.

In the illustrated embodiment, drive mechanism 20 withdraws the web from the roll by inducing tension in the web, i.e., by pulling the web from the roll. During this process, the tension in the web changes as the supply of web 26 on roll 28 depletes. As the web supply on roll 28 depletes, the overall weight of the roll decreases, which reduces the force necessary to rotate the roll to withdraw the web. This has the effect of reducing the tension in the web, i.e., that portion of the web that has been withdrawn from the roll and is being conveyed along path 40 through machine 10. Although the length of the moment arm extending from spool 18 to the outside of roll 28 decreases as the web depletes, which has the effect of increasing the force necessary to rotate the roll, the reduction in roll weight is a more prevalent factor, such that overall tension required to pull the web from the roll decreases as the roll depletes.

The inventors have determined that variation in web tension is a major contributing factor to the mis-alignment of inflatable webs in inflation/sealing machines. Such misalignment, in turn, results in a number of inflation and/or sealing problems, including non-inflation of the containers, under-inflation of the containers, and seal failures, i.e., incomplete or no sealing of those containers that are inflated (resulting in the deflation of such containers).

Accordingly, instead of or in addition to the upwardly-angled configuration of spool 18, tension-control device 58 may be employed in machine 10 to also or further improve the alignment of web 26 along path 40, by reducing the variations in web tension as roll 28 is depleted. The tension-control device 58 performs this function by increasing the frictional resistance it applies to the web 26 as the tension in the web between the drive mechanism 20 and the roll 28 decreases (due to the depletion of the supply of the web on the roll). This is most propitiously accomplished by positioning the tension-control device 58 between the roll 28 and the drive mechanism 20. As a result, the net tensional force in the moving section 60 of web 26 between the tension-control device 58 and drive mechanism 20 remains relatively consistent, i.e., more consistent (less variation) than if the tension-control device 58 were not employed on machine 10.

Figure 4:
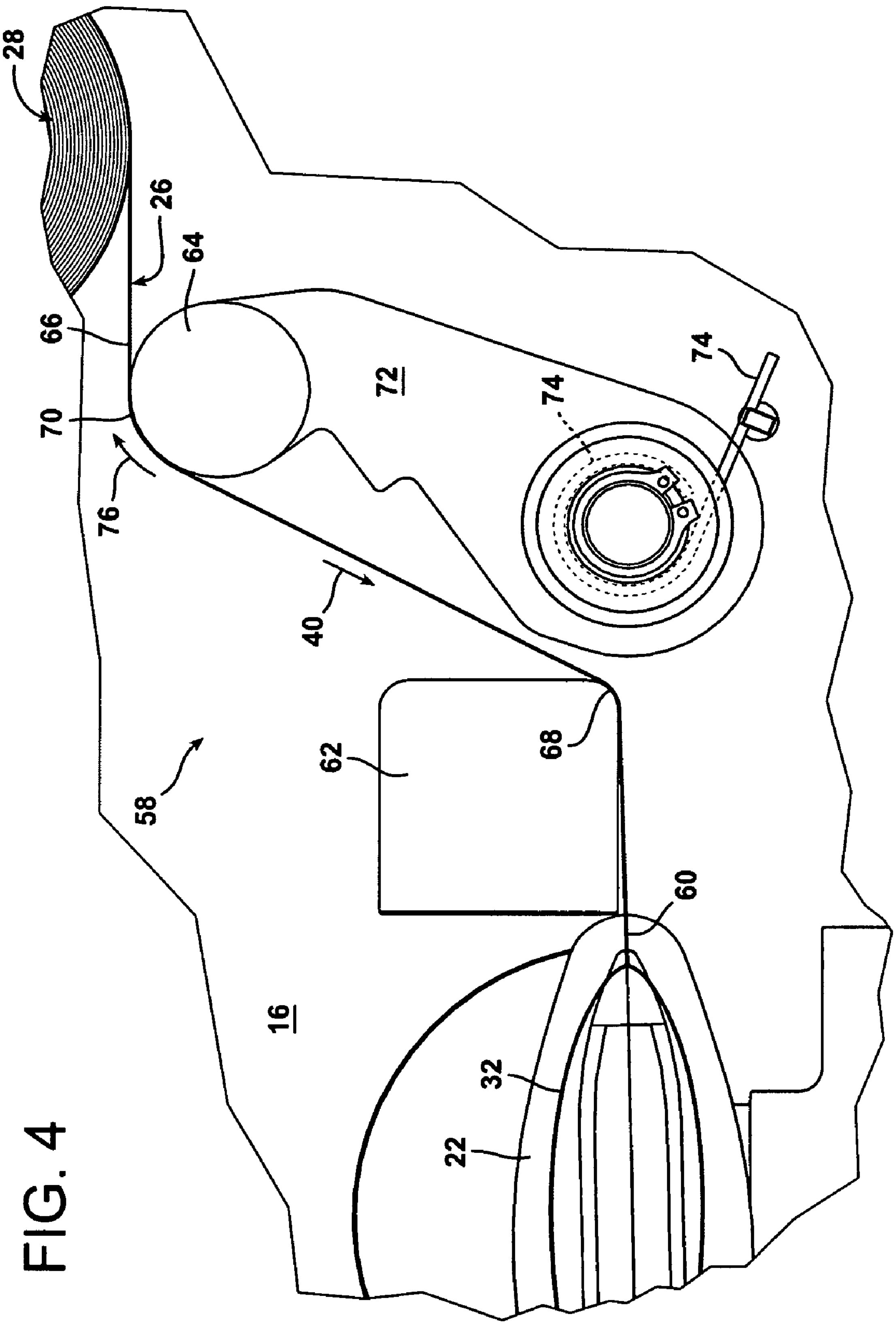
FIG. 4 shows a tension-control component of the machine of FIG. 1 in a minimum friction ('roll full') position.
Figure 5:
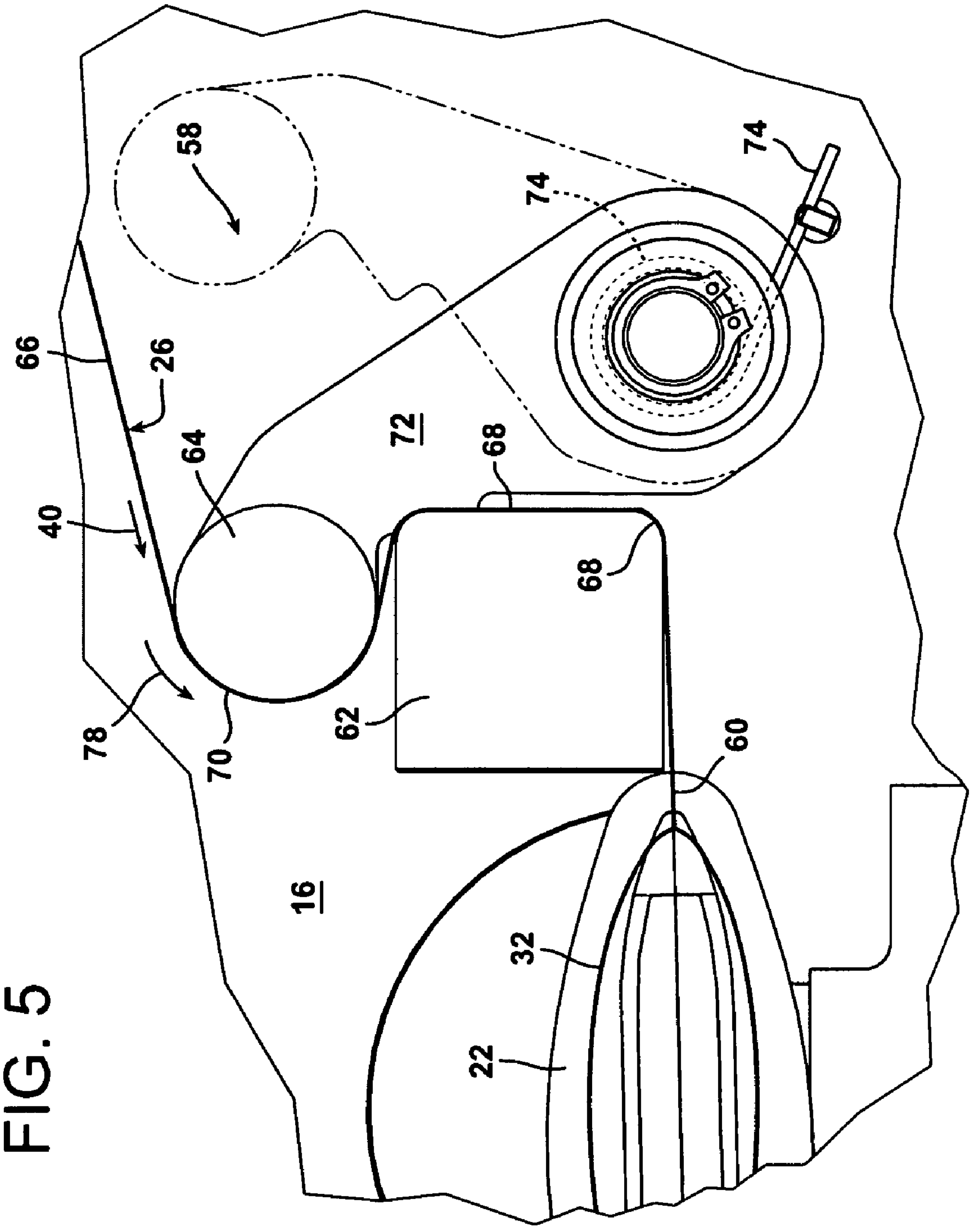
FIG. 5 shows the tension-control component of FIG. 4 in a maximum friction ('roll empty') position.

Tension-control device 58 may comprise a fixed contact member 62 and a movable contact member 64. FIGS. 4-5 are expanded views of the tension-control device 58. FIG. 4 shows the position of the movable contact member 64 when the roll 28 is relatively full; FIG. 5 shows its position when roll 28 is relatively empty. Both of the contact members 62, 64 are structured and arranged to be in contact, e.g., sliding contact, with the web 26 along respective contact surfaces 68 and 70. The sliding contact between the contact members 62, 64 and web 26 provides frictional resistance to the web in opposition its advancement along path 40. The magnitude of such frictional resistance is directly proportional to the size of the contact surfaces 68 and 70, i.e., the greater the area of contact between contact members 62, 64 and web 26, the greater is the frictional resistance to the movement of web 26 against and past the contact members. In the illustrated embodiment, fixed contact member 62 may have a substantially square or rectangular cross-sectional shape, while movable contact member 64 may have a round or oval cross-sectional shape. Various other shapes are, of course, possible, and within the scope of the present invention.

When roll 28 is relatively full as in FIG. 4, the tension in the moving section 66 of web 26 between the roll 28 and the movable contact member 64 is higher than when the roll is relatively empty (due, as explained above, to the higher resistance to rotation provided by a full roll vs. a nearly empty one). Movable contact member 64 moves in response to changes in the tension in web 26, i.e., in moving section 66 thereof, as the web is withdrawn from roll 28. As a result of such movement, the contact surfaces 68 and 70 both vary in size.

More specifically, as may be appreciated by comparing FIG. 4 with FIG. 5, the contact surface 68, 70 of at least one of the fixed and movable contact members 62, 64 increases in size in response to a decrease in tension in the web, i.e., in moving section 66 thereof, as it is withdrawn from roll 28. This may be accomplished by pivotally mounting movable contact member 64 adjacent the fixed contact member 62. Movable member 64 may be mounted, e.g., to base 14 or wall 16, either directly or indirectly (i.e., via a mounting bracket or the like). As illustrated, the movable contact member 64 is pivotally mounted to wall 16 via pivot arm 72, with the pivot arm 72 being pivotally mounted to wall 16 and contact member 64 extending laterally outwards from the pivot arm 72, in a direction leading away from wall 16. Similarly, fixed contact member 62 may be mounted to base 14 and/or wall 16, either directly or indirectly. As illustrated, the fixed contact member 62 is mounted to wall 16.

The contact members 62, 64 may extend outwards and away from wall 16 in a direction that is substantially perpendicular to the wall, or at an angle to the wall. When spool 18 is oriented at an upward angle, e.g., as shown in FIG. 3, contact members 62 and/or 64 may similarly be oriented at an upward angle, which may be the same or different from the upward angle of spool 18.

Pivot arm 72 may be biased, e.g., spring-biased via coil spring 74, such that movable contact member 64 is biased towards fixed contact member 62. The spring force of spring 74 may be selected such that:

when roll 28 is full, the tension in moving web section 66 is sufficiently high to push movable contact member 64 pivotally away from fixed contact member 62, e.g., in the direction of clockwise arrow 76, so that it assumes the position shown in FIG. 4; and when roll 28 is nearly empty, the spring-bias exerted by coil spring 74 is sufficient to overcome the web-tension in moving section 66 such that the movable contact member moves pivotally towards fixed contact member 62, e.g., in the direction of counter-clockwise arrow 78, so that it assumes the position shown in FIG. 5, i.e., in close proximity to fixed contact member 62. When the web tension in section 66 is sufficiently low, the pivot arm 72 may assume a resting position in contact with/urged against fixed contact member 62 as shown in FIG. 5.

When the tension in moving section 66 of web 26 is at a maximum (full roll), such that movable contact member 64 is forced in direction 76 by the web to a position having the maximum distance from fixed contact member 62 (FIG. 4), the size of the contact surfaces 68, 70 are at a minimum. As a result, the frictional resistance to the movement of web 26 is at a minimum when the tension in moving section 66 of web 26 is at a maximum.

On the other hand, when the tension in moving section 66 of web 26 is at a minimum (nearly empty roll), such that movable contact member 64 has moved in direction 78 against the tensional force in web 26 to a position having the minimum distance from fixed contact member 62 (FIG. 5), the size of the contact surfaces 68, 70 are at a maximum. For example, as shown in FIG. 5, the relative positioning of contact members 62, 64 may be such that a tortuous path is formed, e.g., a 'reverse S-shaped' path. As a result, the frictional resistance to the movement of web 26 is at a maximum when the tension in moving section 66 of web 26 is at a minimum.

When a new, full roll 28 is placed on spool 18 and machine 10 is started up, the weight of the full roll results in maximum tension in moving section 66, such that the web lifts movable contact member 64 off of its resting position, e.g., with pivot arm 72 biased against fixed contact member 62, causes it to pivot in the direction of arrow 76 away from the fixed contact member, and holds the contact member 62 in the 'minimum friction' position shown in FIG. 4. The position assumed by movable contact member 64 is the position in which equilibrium is achieved between the tensional force of web section 66, which urges contact member 64 in the direction of arrow 76, and the spring force of spring 74, which urges member 64 in the opposing direction 78. Thus, as the supply of web 26 on roll 28 diminishes such that the weight of the roll decreases, the tension in moving web section 66 decreases. Due to the non-varying spring force of spring 74, this continuing decrease in web tension allows the movable contact member 64 to pivot in the direction of arrow 78, as new equilibrium positions for the contact member 64 are continuously established towards the fixed contact member 62 with the depletion of the supply of web 26 on roll 28. Eventually, as the roll nears complete depletion, the movable contact member 64 has pivoted all the way to the 'maximum friction' position shown in FIG. 5, at which the movable contact member 64 is closest to the fixed contact member 62.

As may be appreciated from FIGS. 4 and 5, the more the movable contact member 64 pivots in the direction of arrow 78 towards the fixed contact member 62, the greater the size of the contact surfaces 68 and 70 become, thereby increasing the frictional resistance to the movement of the web 26 past the tension-control device 58. For example, when contact member 64 is in the position shown in FIG. 4, the contact member 64 is in sliding contact with web 26 over a relatively small percentage, e.g., less than half or about 25%, of the total surface area of the contact member. Thus, the contact surface 70 of contact member 64 may equal less than half (e.g., approximately 25%) of the total surface area of the contact member when the roll 28 is full or nearly full. Conversely, once the movable contact member 64 has pivoted to the 'maximum friction' position shown in FIG. 5, the contact surface 70 has increased to nearly half of the total surface area of the contact member 64, i.e., the contact member 64 makes sliding contact with the web 26 along half of the total surface area of the contact member.

Because of the spatial relationship between the fixed and movable contact members 62, 64, similar considerations may hold true for the size of the contact surface 68. That is, as the movable contact member 64 pivots in the direction of arrow 78, it brings web 26 into an ever-increasing percentage of sliding contact with the total surface of fixed contact member 62, e.g., such that the contact surface 68 when the roll is full (FIG. 4) may equal less than about 25% of the total surface area of the contact member 62, and may equal between about 25-50% of the total surface area of the contact member 62 when the roll is near empty (FIG. 5).

The net result of the operation of the tension-control device 58 is that, as roll 28 is depleted of web 26, the consequent decrease in tension in moving web section 66 is off-set by an increase in frictional resistance to the movement of the web by the tension-control device 58. Such increase in frictional resistance adds tension to the web so that the tension in the moving web section 60, which is downstream of tension-control device 58 and which moves through the tension-sensitive inflation 22, seal 24, and drive 20 components of machine 10, remains relatively consistent, i.e., more consistent than would be the case without the inclusion of tension-control device 58.

As noted above, sealing device 24 seals closed openings 34 of containers 32 by producing a longitudinal seal 48 between film plies 36*a, b*, which intersects transverse seals 38*a, b* near the first ends 42*a* thereof to enclose gas 46 within the containers. In this manner, the pre-formed flexible containers 32 of web 26 are converted into inflated containers 50.

In the presently-illustrated embodiment, the sealing device 24 and drive mechanism 20 are incorporated together as an integrated assembly, which may include a pair of counter-rotating rollers 80, 82 and a sealing element 84 secured to at least one of the rollers, e.g., to roller 80 as shown. As shown, rollers 80, 82 are positioned such that a nip, i.e., an area of tangential contact, is formed therebetween. At least one of the rollers may be linked to a motor, e.g., motor 86 (FIG. 6), such that, when power is supplied to one or both rollers, the rollers rotate so that web 26 is advanced along path 40 when the web passes through the nip between the rollers, i.e., as shown in FIG. 2. Sealing element 84 is adapted to form heat-seals to close the openings 34 of the inflated containers 32/50 as web 26 is advanced along path 40.

Sealing element 84 may be an electrically-heated resistive device, such as a band or wire, which generates heat when an electrical current passes through the element. As shown, sealing element 84 may be mounted on the circumferential surface of roller 80 (or roller 82), such that it rotates against the web 26. When sealing element 84 is mounted on roller 80 as presently illustrated, roller 80 may be considered a "sealing roller" while roller 82 is considered a "backing roller." When heated, the rotational contact between sealing element 84 and web 26, as rollers 80, 82 counter-rotate against web 26, forms the longitudinal seal 48 as the web is conveyed along its path of travel 40.

As shown in FIG. 2, longitudinal seal 48 is oriented in a direction that is substantially parallel to the direction of movement of web 26 along its travel path 40 through machine 10. Seal 48 may be a continuous longitudinal seal, i.e., a substantially linear, unbroken seal, which is interrupted only when the sealing device 24 is caused to stop making the seal.

Figure 7:
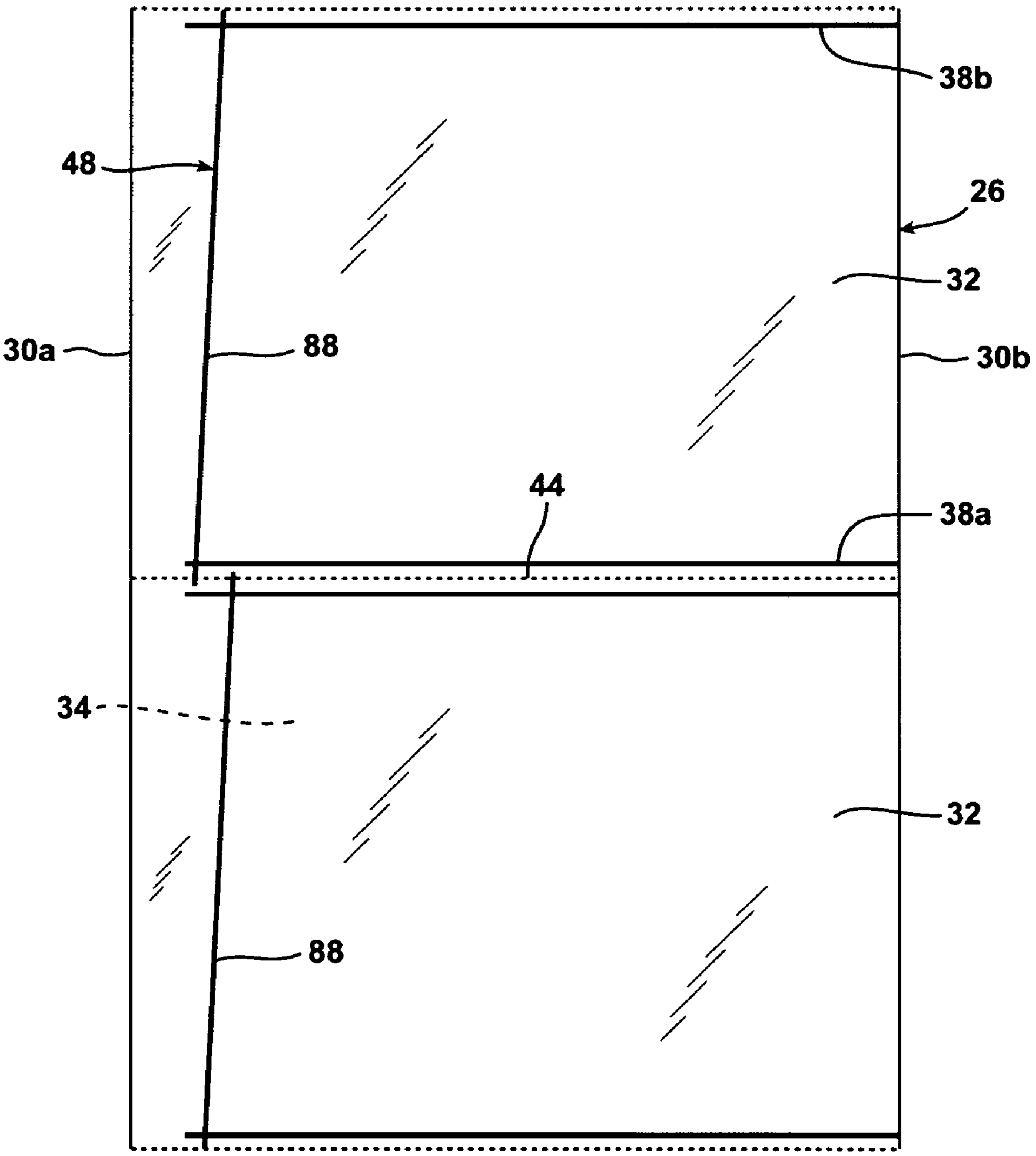
FIG. 7 is a plan view of the inflatable web, showing longitudinal seal segments that may be used to seal closed the openings of the pre-formed containers following the inflation thereof.

Alternatively, sealing device 24 may be adapted to produce longitudinal seal 48 as a discontinuous series of longitudinal seal segments 88, as shown in FIG. 7. When this embodiment is employed, the sealing device 24 is synchronized with roll 28 such that each longitudinal seal segment 88 intersects the transverse seals 38*a, b* across each opening 34 of the containers 32, thereby enclosing gas 46 therewithin to complete the formation of the inflated containers 50.

Figure 8:
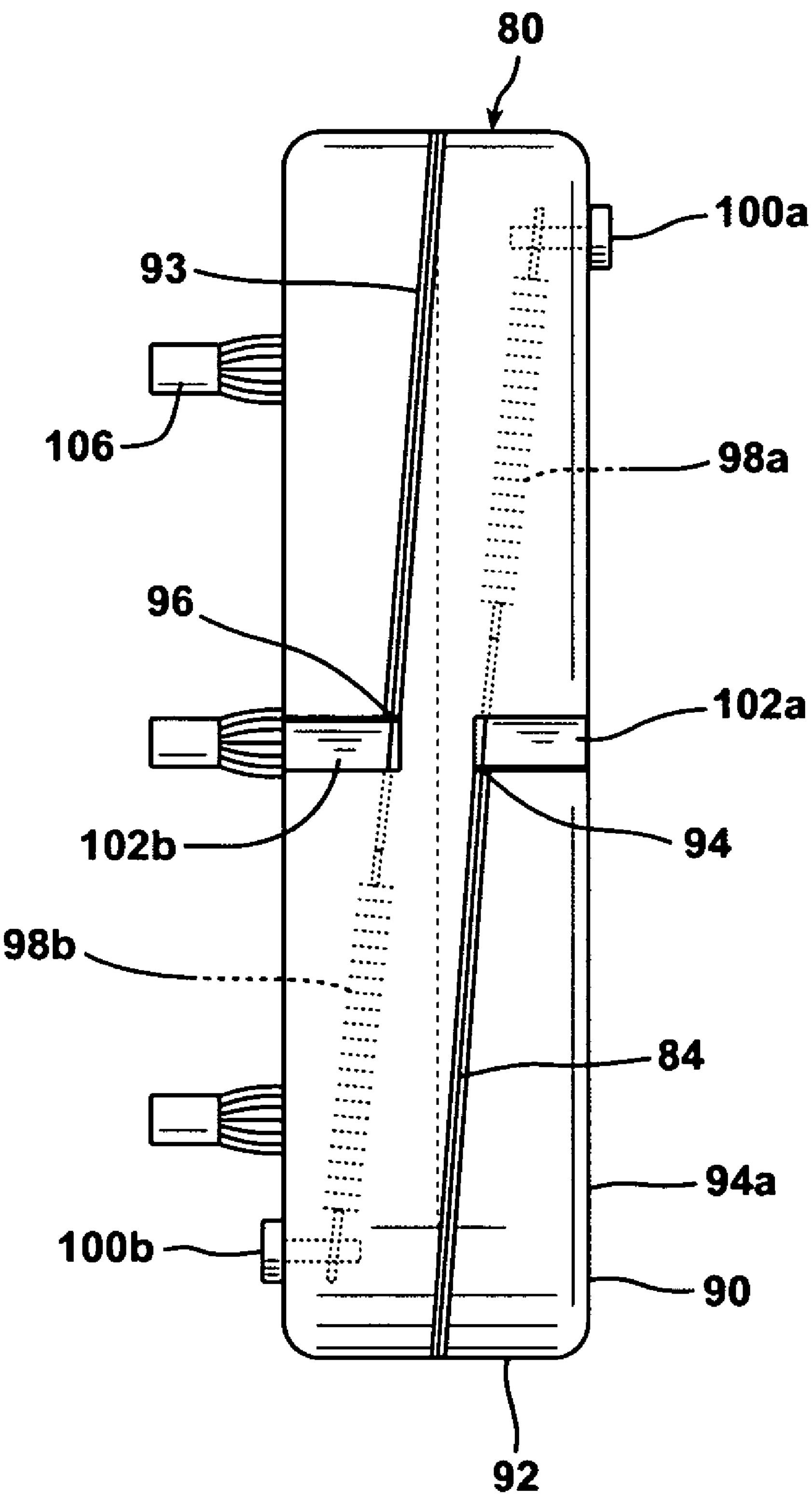
FIG. 8 is an elevational view of a sealing roller capable of making the longitudinal seal segments shown in FIG. 7.

A discontinuous series of longitudinal seal segments 88 may be produced when sealing roller 80 (or roller 82) has the configuration shown in FIG. 8. Sealing roller 80 may, as shown in FIG. 8, may include a rotatable support/drive cylinder 90 having an outer, circumferential surface 92, with sealing element 84 disposed about at least a portion of the outer surface 92 such that that the sealing element rotates with the cylinder.

Sealing element 84 is preferably a resistive element, which produces heat when electricity is supplied thereto, and can have any desired shape or configuration. As shown, element 84 is in the form of a wire. Support cylinder 90 may be formed from any material that is capable of withstanding the temperatures generated by the sealing element, such as metal, e.g., aluminum (preferably electrically-insulated); high-temperature-resistant polymers, e.g., polyimide; ceramics; etc. A groove 93 may be provided in outer surface 92 to accommodate sealing element 84 and keep it in proper position on the outer surface of cylinder 90. The outer surface 92 may be roughened or knurled to facilitate traction between such surface 92 and the surface of web 26 to minimize slippage between the cylinder 90 and the web as the cylinder rotates against the web to convey it along path 40.

As shown in FIG. 8, sealing element 84 may have a first end 94 disposed on the outer surface 92 of cylinder 90, and a second end 96 disposed on the outer surface 92. The first and second ends 94, 96 may be spaced from one another as shown such that the sealing element 84 forms a helical pattern on the surface 92 of cylinder 90. Such helical pattern results in the angled configuration of the longitudinal seal segments 88 shown in FIG. 7. The helical pattern allows for expansion and contraction of the sealing element 84 without breaking or becoming loose on surface 92. Expansion and contraction of sealing element 84 occurs due to temperature changes in the element as it is heated up, e.g., during a warming up period after being idle, or when it is cooled down, e.g., after machine 10 has been turned off after a period of use.

The expansion/contraction of sealing element 84 may be further accommodated by including springs 98*a, b* at respective ends 94, 96 of sealing element 84. The springs may be an integral part of sealing element 84, or simply connected to ends 94, 96 thereof, and may be secured internally within cylinder 90 via fasteners 100*a, b* as shown. Springs 92*a, b* may advantageously exert a tensioning force on sealing element 86, and thereby keep it taught on surface 84 regardless of whether the element is in an expanded or contracted state. The springs 92*a, b* may be contained within grooves (not shown) in the sides of cylinder 90. Slots 102*a, b* may be included to provide a passage for sealing element 84 between the interior of the cylinder and surface 92 thereof as shown.

In some embodiments, the cylinder 90 and sealing element 84 of sealing device 24 may be removable and replaceable as an integral unit. In this manner, when sealing element 84 becomes worn, the entire sealing roller 80 may be manually removed and replaced with a fresh sealing roller without the need to remove a worn sealing element 84 and install a new one on cylinder 90.

Figure 9:
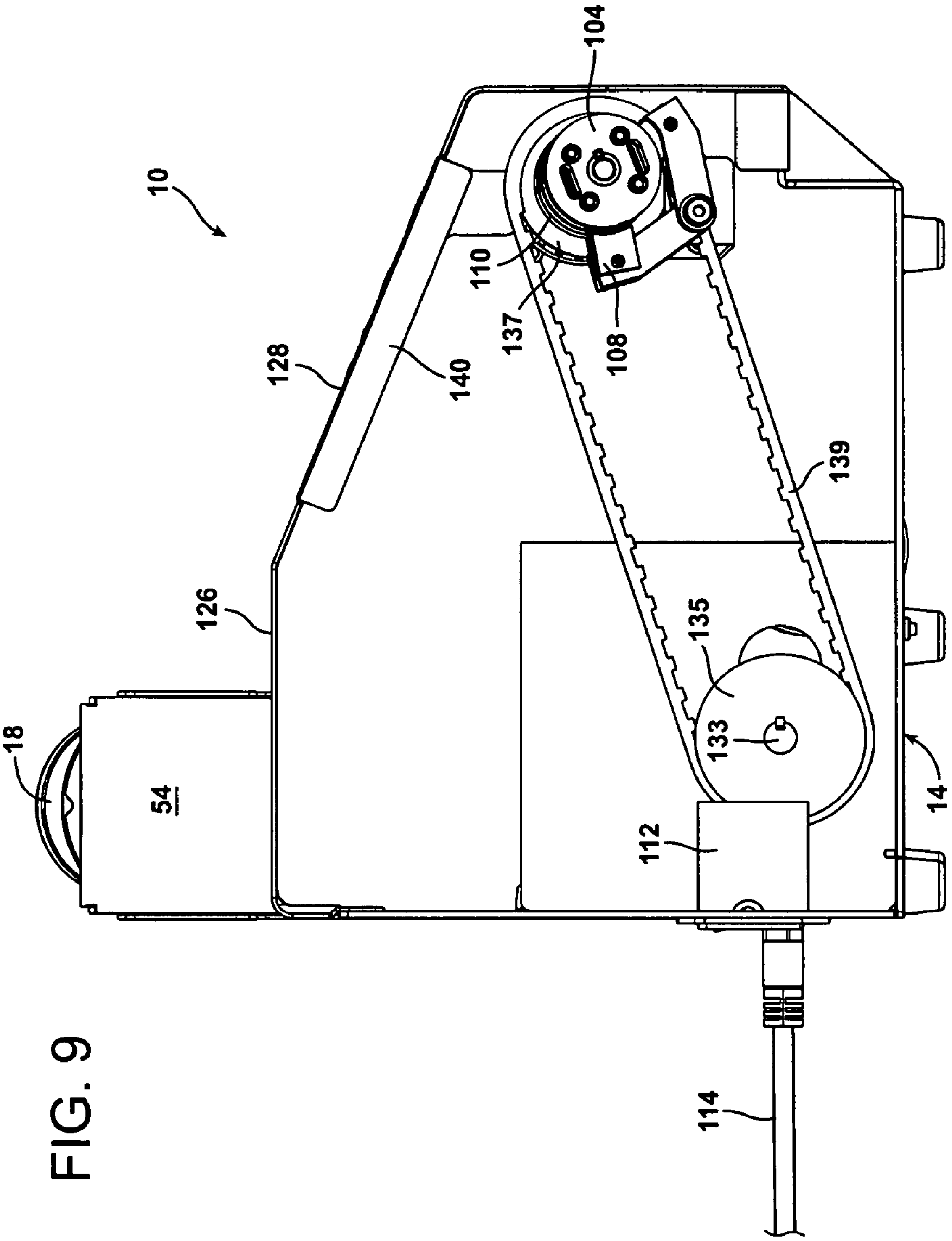
FIG. 9 is an elevational view of the machine, as taken from the opposite side as shown in FIG. 1 and with the side cover removed.

Sealing roller 80 may thus be attached to machine 10 via a rotatable hub 104 (the back of which is shown in FIG. 9), with sealing roller 80 being removably attached thereto via retaining pins 106 on cylinder 90. Pins 106 may be retained in corresponding recesses (not shown) on the front of hub 104 via friction fit, to provide mechanical attachment of sealing roller 80 to the hub. Retaining pins 106 may also be electrically conductive and be connected to the sealing element 84, and thereby provide electrical communication between a source of electricity and the heating element. A suitable type of pin in this regard is known as a "banana plug." Thus, for example, a carbon-brush commutator 108 and slip-ring 110 combination (FIG. 9) may be used to transfer electricity from an electrical junction box 112 in machine 10 to the sealing roller 80 (internal wiring not shown). The junction box 112 may be supplied with electricity from a wall socket or other source via power cord 114.

Further details regarding the above-described sealing roller 80 are disclosed in U.S. Ser. No. 11/099,289, published under Publication Number US-2006-0218880-A1, the entire disclosure of which is hereby incorporated herein by reference thereto.

Figure 10:
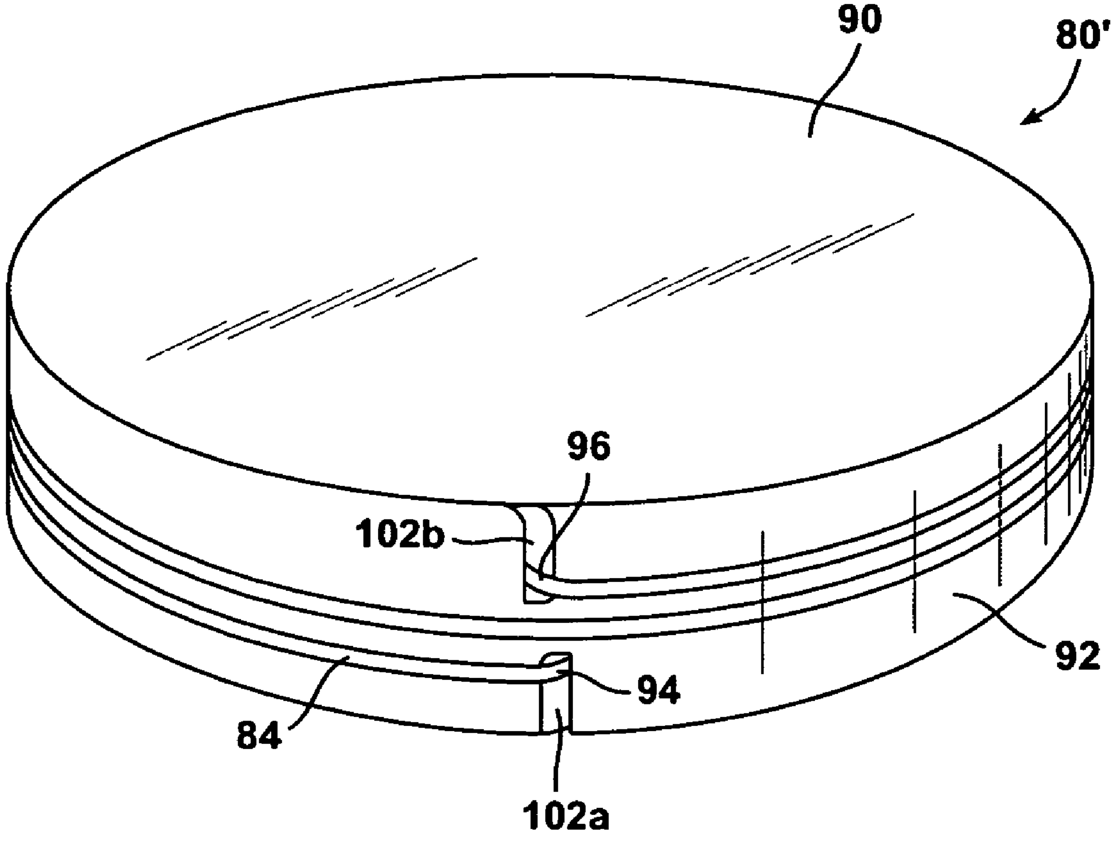
FIG. 10 is a perspective view of an alternative to the device shown in FIG. 8 for making longitudinal seal segments.

As a further alternative, the sealing element may be arranged on the sealing roller as an overlapping helical pattern, e.g., as a 'double helix.' That is, whereas the above-described sealing element 84 is coiled once around the circumferential surface 92 of cylinder 90 to form a 'single helix,' in this alternative embodiment, the sealing element is coiled more than once, i.e., overlapped, about the support cylinder, e.g., to form a double helical pattern. Such an arrangement is shown in FIG. 10, which depicts alternative sealing roller 80'. In sealing roller 80', sealing element 84 is double wound, i.e., coiled twice, about the outer, circumferential surface 92 of cylinder 90 to form a double helix.

Figure 11:
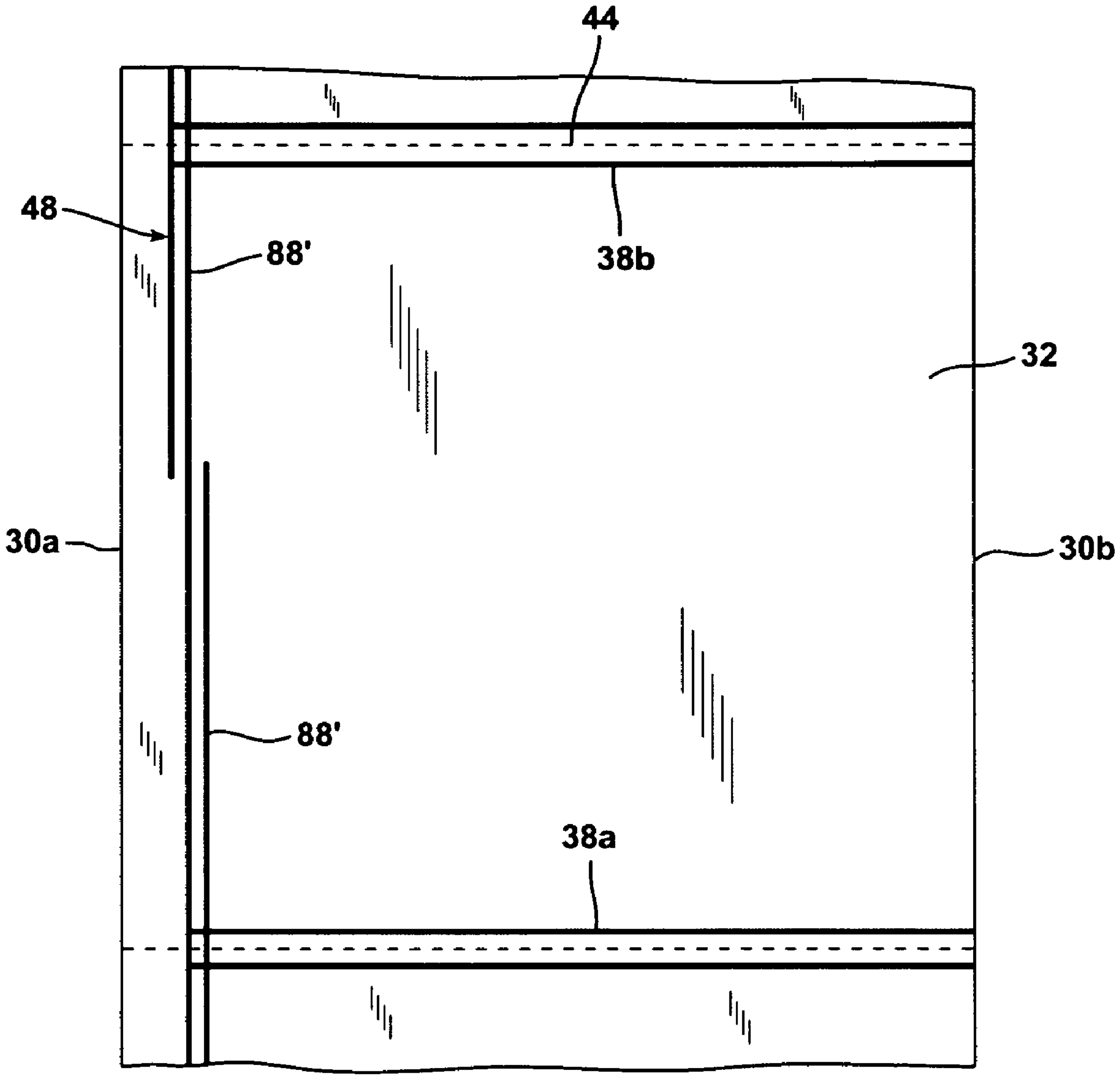
FIG. 11 is an alternative to the longitudinal seal segments shown in FIG. 7, as created by the device shown in FIG. 10.

An advantage of such a double helical pattern is that synchronization is not required between the sealing device 24 and the roll 28. FIG. 11 illustrates a seal pattern that may result for longitudinal seal 48 when sealing roller 80' is not synchronized with roll 28, i.e., with the transverse seals 38*a,b* on web 26. The double winding of the sealing element 84 results in longer longitudinal seal segments 88', which, if of sufficient length, ensures the intersection of the seal segments 88' with the transverse seals 38*a, b* of web 26, regardless of where the seal segments begin and end.

Returning to FIG. 1, it may be seen that drive mechanism 20 may be secured to support structure 12, e.g., to wall 16, via mounting block 116. Sealing roller 80 may include safety shields 118.

Backing roller 82 may be formed from a pliant material, such as, e.g., rubber or RTV silicone. Other materials, e.g., metal rollers with a knurled surface, may also be used as desired.

Figure 6:
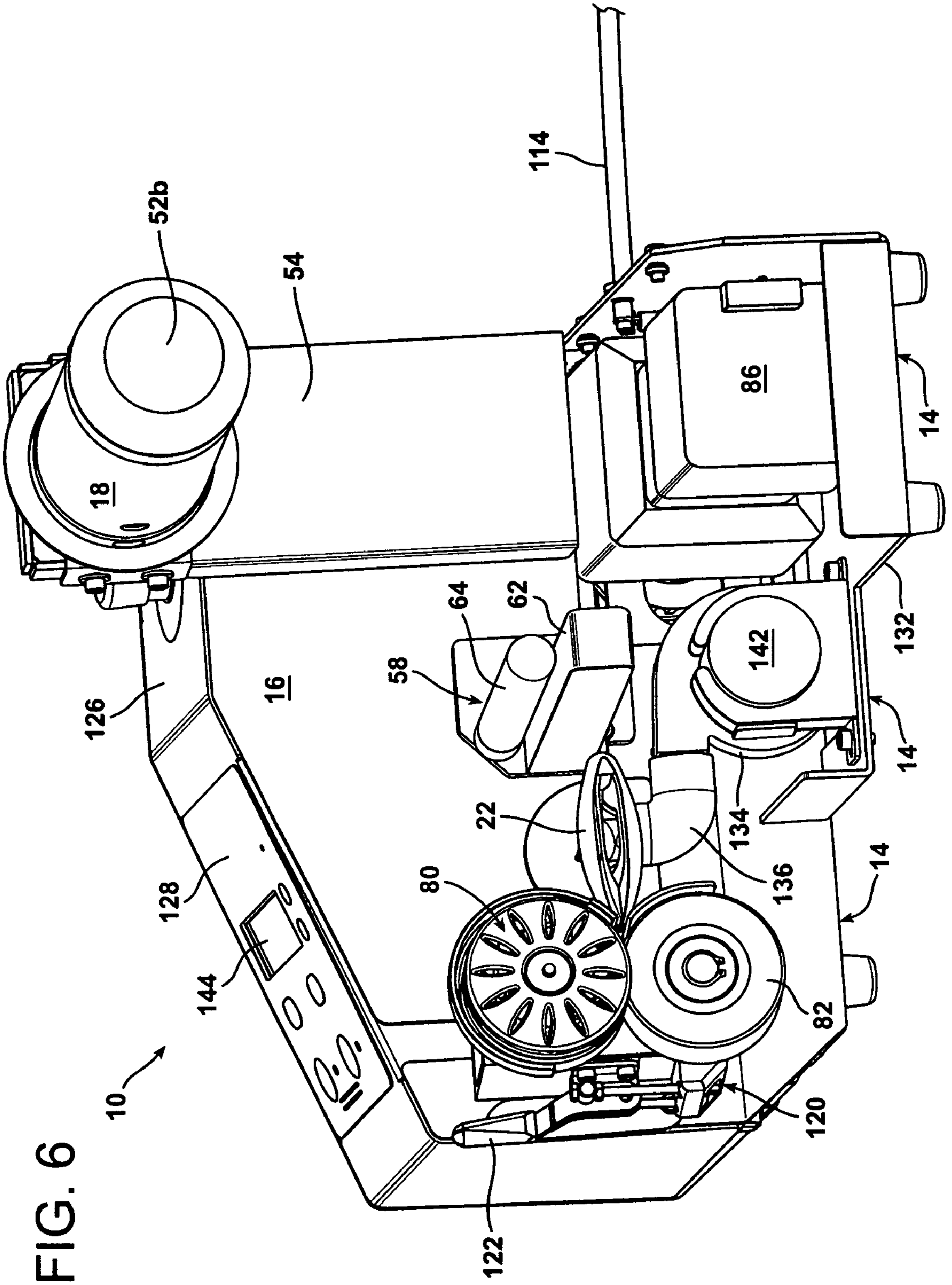
FIG. 6 is similar to FIG. 1, except that the motor cover and blower cover have been removed.

As shown in FIG. 6, mounting block 116 may optionally include a sliding mechanism 120 to which backing roller 82 is mounted, which allows backing roller 82 to be manually moved into and out of contact with sealing roller 80, i.e., by grasping and moving the pivotally-movable handle member 122. Mechanism 120 allows the backing roller 82 to be moved out of contact with sealing roller 80 (i.e., by pivotally moving the handle member 122 in a downward direction) to facilitate the placement of web 26 between such rollers, e.g., upon placement of a new roll 28 on spool 18 and subsequent threading of the new web 26 through the above-described components of machine 10 along path 40. Once the threading is complete, the handle member 122 is moved back to its operating position as shown in FIG. 6, so that the rollers 80, 82 are in compressive contact with opposing sides of web 26 and ready to begin withdrawing the web from the new roll and advancing the web along path 40.

Referring now to FIGS. 6 and 9, some additional features, which may optionally be included in machine 10, will be described. For example, machine 10 may include a housing 126 on the opposite side of wall 16 from that with which the web-handling components (i.e., spool 18, nozzle 22, drive mechanism 24, etc.) are associated. The housing 126 may contain therein various operational devices, some of which are described above (e.g., hub 104), and some of which will be described below. Housing 126 may also contain thereon an operator interface, e.g., a control panel 128, and an emergency stop button 130.

As noted above, at least one of rollers 80, 82 may be linked to motor 86 which, when power is supplied thereto, causes the rollers to rotate such that the web 26 is advanced along travel path 40 when the web passes through the nip between the rollers. As shown in FIG. 6, motor 86 may be positioned on base 14. FIG. 6 is similar to the view of machine 10 shown in FIG. 1, except that some of the protective covers have been removed to show the components beneath. For example, motor cover 124 (FIG. 1) has been removed in FIG. 6 to show motor 86 on base 14. More specifically, motor 86 may be placed on base 14 beneath spool 18, e.g., on the portion 132 of base 14 that extends outwards from wall 16 beneath the spool.

In conventional inflation/sealing machines, the drive motor, and most of the other internal components, are placed inside of the machine housing, e.g., similar to housing 126 as shown in the drawings. As may be appreciated, the placement of the motor, which tends to be relatively large, and the other internal components within the housing dictates the size of the housing and area of the machine's base, i.e., its 'footprint.' Generally, there is a desire to reduce this footprint to the greatest extent possible, as the packaging operating environment in which inflation/sealing machines are used tends to be crowded. Adding to the footprint in conventional machines is a support means in the base to support the weight of the roll of inflatable material.

Advantageously, by placing motor 86 on portion 132 of base 14 as shown, i.e., instead of in housing 126, the width of housing 126 may be reduced without a significant increase in the size of the base-support means for the roll, thus reducing the overall size of the footprint of machine 10. In addition, the placement of the motor 86, which is one of the heavier components of machine 10, beneath spool 18, improves the weight distribution and stability of machine 10 when the web roll 28 is cantilevered from wall 16 as shown.

Motor 86 may drive the rotation, e.g., of sealing roller 80, as shown in FIG. 9, by being positioned such that the drive shaft 133 from the motor extends through wall 16, and is coupled to motor gear 135. Gear 135 may be linked to roller gear 137 via a circular belt or chain 139 as shown, so that the rotation of drive shaft 133 from motor 86 causes the rotation of roller gear 137. Roller gear 137, in turn, may be coupled to hub 104, so that hub 104 rotates with the rotation of roller gear 137. As noted above, sealing roller 80 is attached to hub 104, and the compressive, tangential contact between sealing roller 80 with backing roller 82 means that the rotation of roller 80 (via roller gear 137) causes the counter-rotation of roller 82. Motor 86 may be supplied with power via junction box 112 (wiring not shown).

In accordance with another aspect of the present invention, gas stream 46 may comprise air, and machine 10 may include a blower 134 for generating such gas stream from the ambient air (FIG. 6). The blower 134 may be supplied with power via junction box 112 (wiring not shown).

As shown, blower 134 may be in fluid communication with nozzle 22, e.g., via duct 136 (FIG. 6), such that the air stream 46 is directed through the nozzle, e.g., as shown in FIG. 2. In FIG. 6, blower cover 138 has been removed to show that blower 134 may be positioned on base 14, e.g., proximate nozzle 22 for maximum air delivery (i.e., minimum pressure loss) and speed. Nozzle 22 may be secured in position to direct gas (e.g., air) 46 into the openings 34 of the containers 32 via direct or indirect attachment to wall 16 and/or base 14. As shown, the nozzle is attached to, and may also be supported by, blower 134 via duct 136, and may be further supported via attachment to wall 16.

Blower 134 may be a conventional blower that includes a rotary member, e.g., a fan with a set of blades (not shown), that generates the air stream 46 upon rotation thereof. When blower 134 is supplied with a constant voltage from junction box 112, the rotational speed of the fan changes as each of the containers 32 are inflated, e.g., varies in proportion to the state of inflation of each container such that the rotational speed increases as each container is filled with air. As a filled container passes nozzle 22 and a new container is presented to the nozzle for inflation, the rotational speed decreases but then immediately begins to increase as that container is filled. This cycle of decreasing/increasing rotational speed continues with each passing container.

The inventors have discovered that such speed variability can be used as a basis for automatically monitoring machine 10 for proper operation. That is, by monitoring the rotational speed of the rotary member in blower 134, it is possible to detect the onset of a condition under which the containers 32 are not being inflated, e.g., because of a mis-alignment problem or because the supply of web 26 on roll 28 has been fully depleted.

Accordingly, machine 10 may further include a controller 140 (FIG. 9) and a sensor 142 (FIG. 6). The controller 140 may be positioned within housing 126 and beneath control panel 128 as shown, and may be in communication with sensor 142 (wiring not shown). Sensor 142 may be operative to detect the rotational speed of the fan or other rotary member in blower 134, and send a signal to the controller 140, which is indicative of the detected rotational speed. The controller 140 may be operative to cease operation of machine 10 when the signal from sensor 142 does not indicate a change in rotational speed in blower 134 for a predetermined period of time, e.g., 30 seconds.

Sensor 142 may be an encoder or similar device that optically or mechanically counts the frequency of movement, e.g., rotation, of an intended object, e.g., the blower fan, and transmits a signal that is indicative of such count. Controller 140 may be a PLC, PC, or other standard, programmable device capable of receiving inputs and sending responsive output signals to receivable devices. For example, when the signal from sensor 142 does not indicate a change in rotational speed in blower 134 for a predetermined period of time, controller 140 may send a signal to junction box 112, which commands the junction box to stop sending electrical power to motor 86, commutator 108, and blower 134. Controller 140 may also send an error message to the display screen 144 on control panel 128. In this manner, machine 10 does not continue to waste electricity when roll 28 has been depleted, and does not continue to withdraw and potentially waste inflatable web 26 when a mis-alignment or other problem results in containers 32 not being inflated. The non-operational state of the machine and/or error message will prompt the operator to investigate and rectify the problem.

Alternatively or in addition, a sensor (not shown) may be employed to detect when movable contact member 64 is in its resting position, e.g., with pivot arm 72 biased against fixed contact member 62, as this may indicate that the roll 28 is empty. Upon such detection, the sensor may transmit a signal to controller 140, upon the receipt of which, the controller 140 may send a 'power off' signal to junction box 112.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A machine for inflating and sealing an inflatable web having first and second longitudinal edges and comprising a series of pre-formed flexible containers, each of said pre-formed containers being capable of holding therein a quantity of gas and having an opening at said first edge for receiving such gas, the machine comprising:

a. a support structure having a base and a wall extending upwards from said base;

b. a spool for rotatively supporting a roll of the inflatable web, said spool having a proximal end, at which said spool is attached to said wall, and an opposing distal end, which is spaced from said wall, said distal end having a higher elevation relative to said proximal end such that the roll is gravitationally biased towards said wall;

c. a drive mechanism mounted to said support structure for withdrawing the inflatable web from the roll by inducing tension in the web and advancing the web along a path of travel beside said wall, with the web being oriented such that the first edge thereof is adjacent to said wall;

d. a tension-control device located proximate said wall for applying frictional resistance to the web in opposition to the advancement of the web along the path, said frictional resistance varying in response to changes in the tension in the web as it is withdrawn from the roll, wherein 1) said tension-control device comprises a fixed contact member and a movable contact member, each of said contact members structured and arranged to be in sliding contact with the web along respective contact surfaces, which vary in size, 2) said movable contact member moves in response to changes in the tension in the web as the web is withdrawn from the roll, and 3) the contact surface of at least one of the fixed and movable contact members increases in size in response to a decrease in tension in the web as it is withdrawn from the roll, thereby increasing the frictional-resistance provided by said tension-control device;

e. an inflation nozzle positioned to direct gas into the openings of the containers as the web is advanced along the path, thereby inflating the containers; and f. a sealing device located proximate said inflation nozzle for sealing closed the openings of the inflated containers, wherein, the gravitational bias of the roll towards said wall urges the first edge of the web into alignment with said drive mechanism, inflation nozzle, and sealing device.

2. The machine of claim 1, wherein said wall is oriented at an angle relative to a vertical plane, and said spool is substantially perpendicular to said wall.

3. The machine of claim 1, wherein said wall is oriented in a substantially vertical plane; and said spool is mounted on said wall at an upward angle relative to a horizontal axis passing through said vertical plane.

4. The machine of claim 1, wherein said sealing device and said drive mechanism are incorporated together as an integrated assembly.

5. The machine of claim 4, wherein said integrated assembly comprises a. a pair of counter-rotating rollers positioned such that a nip is formed therebetween, at least one of said rollers being linked to a motor which, when power is supplied thereto, causes said rollers to rotate such that the web is advanced along said path when the web passes through said nip; and b. a sealing element secured to at least one of said rollers, said heating element adapted to form heat-seals to close the openings of the inflated containers as the web is advanced along said path.

6. The machine of claim 5, wherein said motor is positioned on said base.

7. The machine of claim 6, wherein said motor is positioned beneath said spool.

8. The machine of claim 1, wherein the gas used to inflate the containers comprises air;

said machine further includes a blower for generating a stream of air; and said blower is in fluid communication with said nozzle such that the stream of air is directed through said nozzle.

9. The machine of claim 8, wherein said blower is positioned on said base.

10. The machine of claim 8, wherein said blower includes a rotary member that generates the stream of air upon rotation thereof, said rotation having a variable speed that changes as each of said containers are inflated;

said machine further includes a controller and a sensor, said sensor operative to detect the rotational speed of said rotary member and send a signal to said controller, said signal indicative of said rotational speed; and said controller is operative to cease operation of said machine when said signal does not indicate a change in said rotational speed for a predetermined period of time.

11. A machine for inflating and sealing an inflatable web comprising a series of pre-formed flexible containers, each of said pre-formed containers being capable of holding therein a quantity of gas and having an opening for receiving such gas, the machine comprising:

a. a support structure having a base and a wall extending upwards from said base;

b. a spool attached to the wall for rotatively supporting a roll of the inflatable web;

c. a drive mechanism mounted to said support structure for withdrawing the inflatable web from the roll by inducing tension in the web to advance the web along a path of travel beside said wall, with the web being oriented such that the openings of the containers are adjacent to said wall;

d. a tension-control device located proximate said wall for applying frictional resistance to the web in opposition to the advancement of the web along the path, said frictional resistance varying in response to changes in the tension in the web as it is withdrawn from the roll, wherein 1) said tension-control device comprises a fixed contact member and a movable contact member, each of said contact members structured and arranged to be in sliding contact with the web along respective contact surfaces, which vary in size, 2) said movable contact member moves in response to changes in the tension in the web as the web is withdrawn from the roll, and 3) the contact surface of at least one of the fixed and movable contact members increases in size in response to a decrease in tension in the web as it is withdrawn from the roll, thereby increasing the frictional-resistance provided by said tension-control device;

e. an inflation nozzle positioned to direct gas into the openings of the containers as the web is advanced along the path, thereby inflating the containers; and f. a sealing device located proximate said inflation nozzle for sealing closed the openings of the inflated containers.

12. The machine of claim 11, wherein said wall is oriented at an angle relative to a vertical plane, and said spool is substantially perpendicular to said wall.

13. The machine of claim 11, wherein said wall is oriented in a substantially vertical plane; and said spool is mounted on said wall at an upward angle relative to a horizontal axis passing through said vertical plane.

14. The machine of claim 11, wherein said sealing device and said drive mechanism are incorporated together as an integrated assembly.

15. The machine of claim 14, wherein said integrated assembly comprises a. a pair of counter-rotating rollers positioned such that a nip is formed therebetween, at least one of said rollers being linked to a motor which, when power is supplied thereto, causes said rollers to rotate such that the web is advanced along said path when the web passes through said nip; and b. a sealing element secured to at least one of said rollers, said heating element adapted to form heat-seals to close the openings of the inflated containers as the web is advanced along said path.

16. The machine of claim 15, wherein said motor is positioned on said base.

17. The machine of claim 16, wherein said motor is positioned beneath said spool.

18. The machine of claim 11, wherein the gas used to inflate the containers comprises air;

said machine further includes a blower for generating a stream of air; and said blower is in fluid communication with said nozzle such that the stream of air is directed through said nozzle.

19. The machine of claim 18, wherein said blower is positioned on said base.

20. The machine of claim 18, wherein said blower includes a rotary member that generates the stream of air upon rotation thereof, said rotation having a variable speed that changes as each of said containers are inflated;

said machine further includes a controller and a sensor, said sensor operative to detect the rotational speed of said rotary member and send a signal to said controller, said signal indicative of said rotational speed; and said controller is operative to cease operation of said machine when said signal does not indicate a change in said rotational speed for a predetermined period of time.

21. A machine for inflating and sealing an inflatable web having first and second longitudinal edges and comprising a series of pre-formed flexible containers, each of said pre-formed containers being capable of holding therein a quantity of gas and having an opening at said first edge for receiving such gas, the machine comprising:

a. a support structure having a base and a wall extending upwards from said base;

b. a spool for rotatively supporting a roll of the inflatable web, said spool having a proximal end, at which said spool is attached to said wall, and an opposing distal end, which is spaced from said wall, said distal end having a higher elevation relative to said proximal end such that the roll is gravitationally biased towards said wall;

c. a drive mechanism mounted to said support structure for withdrawing the inflatable web from the roll and advancing the web along a path of travel beside said wall, with the web being oriented such that the first edge thereof is adjacent to said wall;

d. a blower for generating a stream of air and an inflation nozzle in fluid communication with said blower such that the stream of air is directed through said nozzle, said nozzle being positioned to direct the stream of air into the openings of the containers as the web is advanced along the path, thereby inflating the containers, said blower including a rotary member that generates the stream of air upon rotation thereof, said rotation having a variable speed that changes as each of said containers are inflated;

e. a controller and a sensor, said sensor operative to detect the rotational speed of said rotary member and send a signal to said controller, said signal being indicative of said rotational speed, wherein said controller is operative to cease operation of said machine when said signal does not indicate a change in said rotational speed for a predetermined period of time; and f. a sealing device located proximate said inflation nozzle for sealing closed the openings of the inflated containers, wherein, the gravitational bias of the roll towards said wall urges the first edge of the web into alignment with said drive mechanism, inflation nozzle, and sealing device.

22. A machine for inflating and sealing an inflatable web comprising a series of pre-formed flexible containers, each of said pre-formed containers being capable of holding therein a quantity of gas and having an opening for receiving such gas, the machine comprising:

a. a support structure having a base and a wall extending upwards from said base;

b. a spool attached to the wall for rotatively supporting a roll of the inflatable web;

c. a drive mechanism mounted to said support structure for withdrawing the inflatable web from the roll by inducing tension in the web to advance the web along a path of travel beside said wall, with the web being oriented such that the openings of the containers are adjacent to said wall;

d. a tension-control device located proximate said wall for applying frictional resistance to the web in opposition to the advancement of the web along the path, said frictional resistance varying in response to changes in the tension in the web as it is withdrawn from the roll;

e. a blower for generating a stream of air and an inflation nozzle in fluid communication with said blower such that the stream of air is directed through said nozzle, said nozzle being positioned to direct the stream of air into the openings of the containers as the web is advanced along the path, thereby inflating the containers, said blower including a rotary member that generates the stream of air upon rotation thereof, said rotation having a variable speed that changes as each of said containers are inflated;

f. a controller and a sensor, said sensor operative to detect the rotational speed of said rotary member and send a signal to said controller, said signal being indicative of said rotational speed, wherein said controller is operative to cease operation of said machine when said signal does not indicate a change in said rotational speed for a predetermined period of time; and g. a sealing device located proximate said inflation nozzle for sealing closed the openings of the inflated containers.

* * * * *